(12) United States Patent
Katoh et al.

(10) Patent No.: US 9,205,856 B2
(45) Date of Patent: Dec. 8, 2015

(54) VEHICLE

(71) Applicant: TOYOTA JIDOSHA KABUSHIKI KAISHA, Toyota-shi (JP)

(72) Inventors: Kohshi Katoh, Hadano (JP); Kuniaki Gotou, Nagoya (JP); Eishi Takeuchi, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/540,162

(22) Filed: Nov. 13, 2014

(65) Prior Publication Data
US 2015/0137468 A1 May 21, 2015

(30) Foreign Application Priority Data
Nov. 15, 2013 (JP) .................................. 2013-237163

(51) Int. Cl.
*B62D 1/02* (2006.01)
*B62D 9/02* (2006.01)

(52) U.S. Cl.
CPC ... *B62D 1/02* (2013.01); *B62D 9/02* (2013.01)

(58) Field of Classification Search
CPC ..................................... B62D 1/02; B62D 9/02
See application file for complete search history.

(56) References Cited

U.S. PATENT DOCUMENTS

| | | | |
|---|---|---|---|
| 6,676,138 B1 | 1/2004 | Rosso | |
| 8,381,847 B2* | 2/2013 | Polutnik | 180/65.1 |
| 8,882,145 B1* | 11/2014 | Worobey | 280/771 |
| 2003/0090076 A1 | 5/2003 | Beleski | |
| 2005/0077098 A1 | 4/2005 | Takayanagi et al. | |
| 2006/0175098 A1* | 8/2006 | Sutherland | 180/6.24 |
| 2008/0217085 A1* | 9/2008 | Wernli | 180/210 |
| 2014/0058600 A1* | 2/2014 | Hoffmann et al. | 701/22 |
| 2014/0091545 A1* | 4/2014 | Wernli | 280/87.041 |

FOREIGN PATENT DOCUMENTS

| | | | |
|---|---|---|---|
| JP | H04-317882 A | 11/1992 | |
| JP | 2002537959 A | 11/2002 | |
| JP | 2005104355 A | 4/2005 | |
| JP | 3853654 B2 | 12/2006 | |
| JP | 2010-254216 A | 11/2010 | |
| JP | 2012-111305 A | 6/2012 | |
| JP | 2012-224260 A | 11/2012 | |
| JP | 2013-112235 A | 6/2013 | |

\* cited by examiner

*Primary Examiner* — Drew Brown
(74) *Attorney, Agent, or Firm* — Kenyon & Kenyon LLP

(57) ABSTRACT

The vehicle having a pair of left and right wheels includes a seating section configured such that a driver is able to take a seat by straddling the same, foot placement sections located beneath the seating section to be respectively provided at left and right positions with the seating section interposed therebetween, the foot placement sections being respectively supported by lower arms connected to the wheels, feet of the driver being placed on the foot placement sections, and a grip section gripped with a hand of the driver. Left and right steering may be performed by twisting the feet placed on the foot placement sections by the driver.

5 Claims, 8 Drawing Sheets

VEHICLE

CROSS-REFERENCE TO RELATED APPLICATION

The present application claims priority to Japanese Patent Application No. 2013-237163 filed on Nov. 15, 2013, which is incorporated herein by reference in its entirety.

BACKGROUND OF THE INVENTION

1. Field of the Invention

The present invention relates to a vehicle.

2. Related Background Art

Conventionally, a vehicle in which a driver sits on a driver seat and performs a driving operation is known, for example, as disclosed in Japanese Unexamined Patent Application Publication No. 2012-111305. Such a vehicle includes a driver seat on which a driver sits, and the driver seat has a backrest section extending upward from the rear of a seat section directed in a horizontal direction. The driver sits on the driver seat, rests the driver's waist and back against the backrest section, stretches legs in a forward direction from the driver seat to take the seat, and performs a driving operation. That is, the driver drives the vehicle in a posture of putting feet ahead of the waist and knees and leaning the back against the backrest section.

Japanese Patent No. 3853654, and Japanese Unexamined Patent Application Publication No. H04-317882 and No. 2013-112235 are examples of the related art.

Vehicles in which a driving operation is performed in a good healthy driving posture are desirably developed. For example, in the above-mentioned vehicle, the driver drives in a posture of putting the feet ahead of the waist and the knees and leaning the back against the backrest section. In this case, retroversion moment occurs in the pelvis by influences of hamstring muscles of the legs stretching forward, and the driver's back tends to stoop due to retroversion of the pelvis. In addition, a main point of the upper body portion affected by gravity (for instance, a lumbar vertebra) and a main point of a seat surface reaction (for instance, a portion around a hipbone) are shifted in forward and rearward directions in a side view, thereby allowing the retroversion moment to occur in the pelvis. The driver's back tends to be in a stooped posture due to the retroversion of the pelvis. For this reason, it is difficult to mention this posture as a good healthy driving posture.

In the driving posture, the driving operation is performed in a state in which muscular strength used in everyday life is not used very much, and as such, the balance of muscular strength of rotation of the spinal cord may be mismatched due to lack of utilization of the muscular strength.

Accordingly, in the field of the present technique, it is desired to provide a healthy vehicle achieved by enabling a driving operation using muscular strength of the legs to be performed in a good driving posture.

That is, according to an aspect of the present invention, a vehicle is a vehicle having a pair of left and right wheels and the vehicle includes a seating section configured such that an occupant is able to take a seat by straddling the same, foot placement sections located beneath the seating section to be respectively provided at left and right positions with the seating section interposed therebetween, the foot placement sections being respectively supported by lower arms connected to the wheels, feet of the seated occupant being placed on the foot placement sections, and a grip section gripped with a hand of the occupant, wherein the foot placement sections are configured to rotate by movement of the feet of the occupant, and enable steering to be performed to the left and the right by rotation of the foot placement sections.

The vehicle includes the seating section configured such that the occupant is able to take the seat by straddling the same, and the foot placement sections provided at the left and right positions with the seating section interposed therebetween. Thereby, the occupant has a posture in which a head, a waist, and feet of the occupant are positioned in a nearly straight line in a vertical direction when the occupant sits on the seating section and places the feet on the foot placement sections. For this reason, retroversion of the pelvis of the occupant due to seating is suppressed and a seating posture is suppressed from being a stooped posture. Therefore, a good healthy driving posture can be assumed.

In addition, since the foot placement sections are supported by the lower arms, the vehicle is easily inclined in a lateral direction by keeping or kicking the feet placed on the foot placement sections and the inclined state is easily adjusted. Furthermore, since a steering operation is performed by moving the feet placed on the foot placement sections by the occupant, the steering operation can be performed using the leg muscles used in everyday life and a driving operation may be performed using the leg muscles. Furthermore, in the driving posture in which the head, the waist, and the feet of the occupant are positioned in a nearly straight line in the vertical direction, weight of the occupant is facilitated so as to be put on the feet and the steering operation according to twisting of the feet is easily performed. As such, the driving operation using the leg muscles can be performed in a good driving posture and the healthy vehicle can be provided.

The vehicle according to the aspect of the present invention may further include wheel steering effort transfer mechanisms that transfer steering effort to the wheels according to rotation of the foot placement sections, and the foot placement sections may be configured to rotate by movement of the feet of the occupant, and enable steering to be performed to the left and the right through the wheel steering effort transfer mechanisms by rotation of the foot placement sections.

In this case, the vehicle includes the wheel steeling effort transfer mechanisms which transfer steering effort to the wheels according to the rotation of the foot placement sections. Thereby, the steering effort may be transferred to wheels according to rotation of the foot placement sections by moving the feet by the occupant or the like and the vehicle can be surely turned.

The vehicle according to the aspect of the present invention may further include a right lower arm connected to a right wheel of the wheels and a left lower arm connected to a left wheel of the wheels, and the right and left lower arms may be mounted so as to be rotatable about the same axial line extending in a forward and rearward direction.

In this case, the right lower arm connected to the right wheel and the left lower arm connected to the left wheel are mounted so as to be rotatable about the same axial line. Accordingly, when the vehicle is turned, a variation in position of the lower arm to which each foot placement section is mounted is decreased, and a variation in height position between the left and right lower arms is decreased. For this reason, the feet of the occupant are suppressed from significantly moving in the vertical direction when the vehicle is turned, and thus a stable driving operation can be performed.

The vehicle according to the aspect of the present invention may further include a front wheel provided in front of the seating section and a rear wheel provided behind the seating section, in addition to the wheels. Furthermore, the vehicle according to the aspect of the present invention may further include a front wheel steering effort transfer mechanism that transfers steering effort to the front wheel according to the rotation of the foot placement sections, and the foot placement sections enable steering to be performed to the left and the right through the front wheel steering effort transfer mechanism by rotation of the foot placement sections.

According to the present invention, it is possible to provide a healthy vehicle achieved by enabling a driving operation using muscular strength of the legs to be performed in a good driving posture.

DESCRIPTION OF THE PREFERRED EMBODIMENTS

Figure 1:
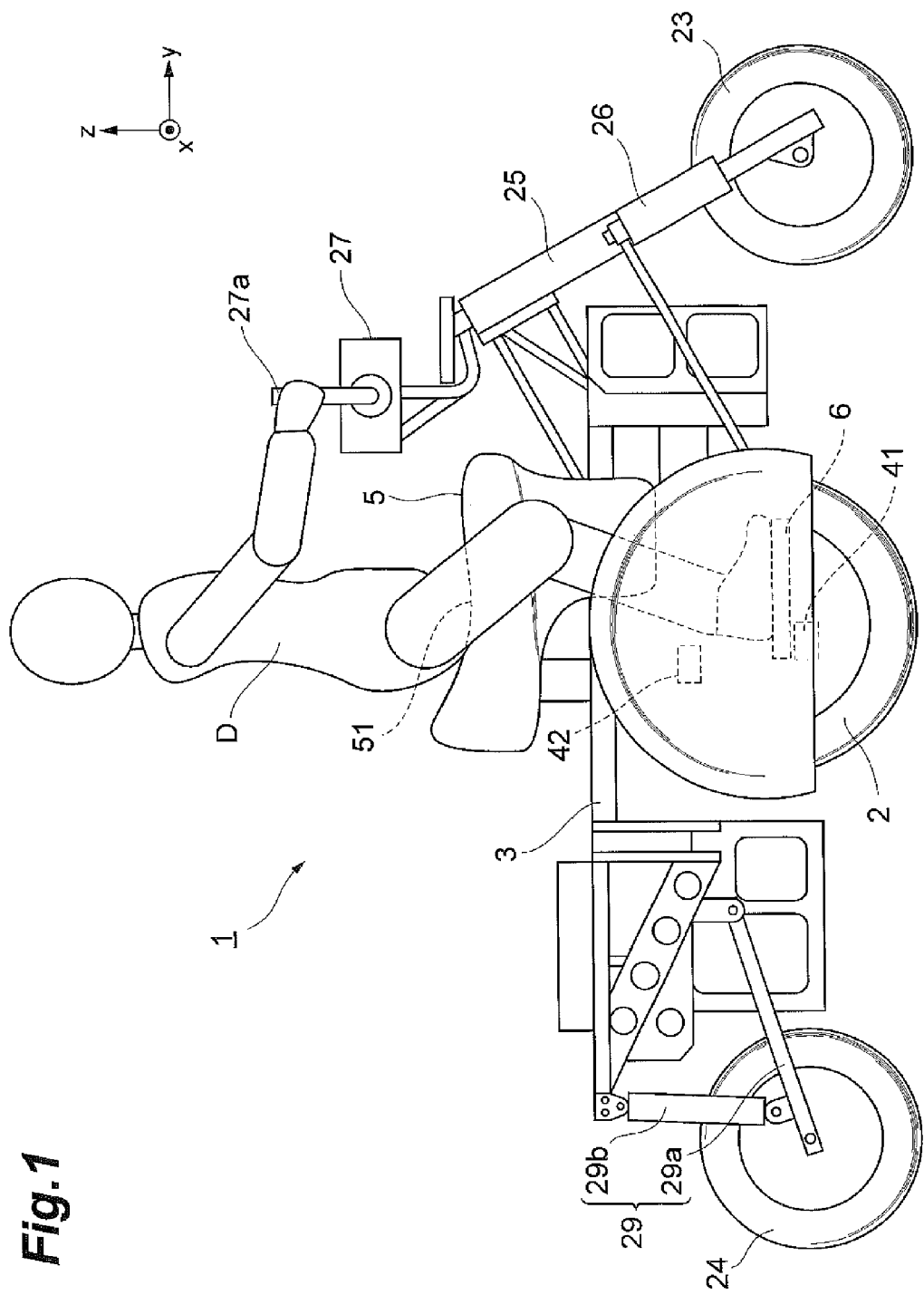
FIG. 1 is a view schematically illustrating a configuration of a vehicle according to an embodiment of the present invention.

Hereinafter, an embodiment of the present invention will be described in detail with reference to the accompanying drawings. In description of the drawings, like reference numerals refer to like components, and redundant description thereof will be omitted. In addition, in each drawing, a horizontal direction or a vehicle width direction is indicated by an x-direction, a forward and rearward direction or a traveling direction is indicated by a y-direction, and a vertical direction is indicated by a z-direction.

Figure 2:
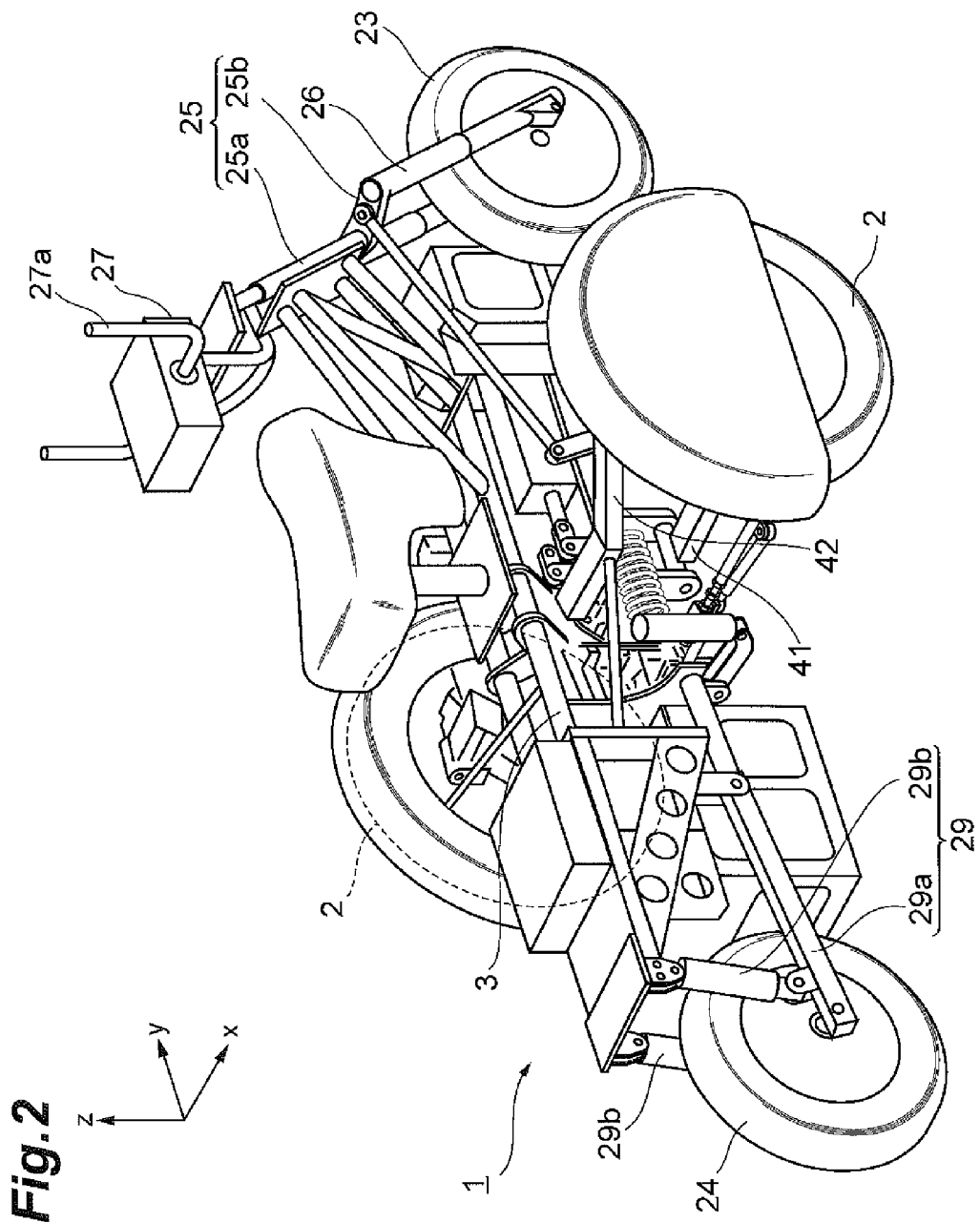
FIG. 2 is a perspective view illustrating the vehicle of FIG. 1.

FIG. 1 is a view schematically illustrating a configuration of a vehicle according to an embodiment of the present invention, FIG. 1 being a view when the vehicle is viewed from the side. FIG. 2 is a perspective view schematically illustrating the vehicle according to the embodiment.

A vehicle 1 according to the embodiment is a vehicle including a pair of left and right wheels 2 and 2, travels in such a manner that a driver D boards the vehicle to perform a driving operation, and functions as a moving object, a traveling object, or a traveling vehicle. The driver D is an occupant boarding the vehicle 1. FIG. 1 shows only a right wheel 2 of the pair of wheels 2 and 2. In addition, although a case in which the vehicle is boarded by one occupant is described in the embodiment, the present invention may also be applied to a vehicle boarded by a plurality of occupants.

Each of the wheels 2 is mounted to a main body 3 through a lower arm 41 and an upper arm 42. The wheels 2 are respectively provided at the right and the left of the main body 3 one by one, and for example, each functions as a side wheel or an auxiliary wheel of the vehicle 1. The main body 3 is a vehicle body forming a main body portion of the vehicle 1. For example, the main body 3 has a long shape in the forward and rearward direction of the vehicle 1 and has a frame structure in which a plurality of rod-shaped members is joined to each other. In addition, the main body 3 may also have a structure other than the frame structure as long as the main body 3 is of a structure having stiffness capable of supporting the driver D boarding the vehicle. For example, the main body 3 may also be configured by combining a rod-shaped member, a plate-shaped member, a block-shaped member, etc. The right wheel 2 is mounted through the associated lower arm 41 and upper arm 42 which are provided so as to protrude to the right from the main body 3. Although not shown in FIG. 1, the left wheel 2 is also mounted through the associated lower arm 41 and upper arm 42 which are provided so as to protrude from the main body 3, similarly to the right wheel 2. In addition, a mounting structure of the lower arm 41 and the upper arm 42 will be described in detail later.

A front wheel 23 and a rear wheel 24 are mounted to the main body 3. That is, the vehicle 1 includes four wheels consisting of the front wheel 23, the rear wheel 24, and the pair of left and right wheels 2 and 2. The front wheel 23 is provided in front of a seating section 5 and the rear wheel 24 is provided behind the seating section 5. For example, the front wheel 23 is mounted to a front portion of the main body 3, the rear wheel 24 is mounted to a rear portion of the main body 3, and the wheels 2 are respectively mounted to the right and the left of the main body 3 at a position between the front wheel 23 and the rear wheel 24. Although each of the wheels 2 has a greater outer diameter than the front and rear wheels 23 and 24 in the embodiment, the wheel 2 may also have a smaller outer diameter than the front and rear wheels 23 and 24.

The front wheel 23 is mounted to the front portion of the main body 3 through a steering mechanism 25 and a suspension mechanism 26. The front wheel 23 functions as a steering wheel or a turning wheel of the vehicle 1. That is, the vehicle 1 turns to the right in such a manner that a forward portion of the front wheel 23 is directed from the front to the right when steering effort is transferred to the front wheel 23, and the vehicle 1 turns to the left in such a manner that the forward portion of the front wheel 23 is directed to the left when the steering effort is transferred to the front wheel 23.

The steering mechanism 25 is a mechanism for transferring steering effort to the front wheel 23, and for example, is configured such that a horizontal member 25b directed in the horizontal direction is mounted to a lower end of a steering shaft 25a. The steering shaft 25a is a shaft member arranged in the vertical direction and is rotatably mounted to the front portion of the main body 3. The suspension mechanism 26 is coupled to a lower portion of the steering mechanism 25. The suspension mechanism 26 has a shock-absorbing function while rotatably supporting the front wheel 23 as a wheel, and includes a spring, a shock absorber, and the like. For example, the suspension mechanism 26 is a telescopic fork type suspension mechanism, and is configured such that two shaft members having the spring and the shock absorber are arranged at the right and the left of the front wheel 23, respectively. The vehicle 1 is inclined forward by a lower side of the front fork type suspension mechanism 26 and the front wheel 23 is mounted to the suspension mechanism 26 with a positive caster angle. In addition, the steering mechanism 25 and the suspension mechanism 26 are not limited to the above-mentioned type, and other types may also be used as long as the steering effort is transferred to the front wheel 23 while the front wheel 23 is rotatably supported as a wheel.

The rear wheel 24 is mounted to the rear portion of the main body 3 through a suspension mechanism 29. The rear wheel 24 functions as a driving wheel of the vehicle 1. That is, the vehicle 1 travels by rotating the rear wheel 24 by means of rotary power transferred from a power source. For example, a motor is used as the power source. In addition, a power source other than the motor may also be used as the power source as long as the rear wheel 24 is driven. For example, an engine may also be used as the power source. In addition, a wheel-in motor provided within the rear wheel 24 may also be adopted. In addition, the front wheel 23 and the wheels 2 may also be used as a driving wheel, instead of the rear wheel 24.

The suspension mechanism 29 has a shock-absorbing function while rotatably supporting the rear wheel 24 as a wheel, and for example, is a swing arm type suspension mechanism including a swing arm 29a and a shock absorber 29b. The swing arm 29a is rotatably mounted at a lower position of the rear portion of the main body 3, and the rear wheel 24 is axially supported at a rear end of the swing arm 29a. The shock absorber 29b is rotatably mounted at an upper position of the rear portion of the main body 3, and a lower end thereof is rotatably mounted to a rear portion of the swing arm 29a. The shock absorber 29b has a built-in support spring member such as a spring. In addition, suspension mechanisms of other types may also be used as the suspension mechanism 29 as long as the rear wheel 24 is rotatably supported as a wheel.

The seating section 5 is mounted to the main body 3. The seating section 5 is a seating section on which the driver D sits, and functions as a driver seat or a driving seat. The seating section 5 is at a central position of the main body 3 in the forward and rearward direction thereof, and is located at an upward position of the lower arm 41. In addition, the central position of the main body 3 also includes a nearly central position of the main body 3.

The seating section 5 is configured such that the driver D may take a seat by straddling the same. For example, a seating section having a shape or form such as a saddle used for horseback riding is used as the seating section 5, and the seating section 5 functions as a saddle member or a saddle section which stabilizes the seating of the driver D. The seating section 5 has a seat section 51 formed with a lateral width such that the driver D may lower left and right legs in a downward direction in a straddling state. For example, the seat section 51 is configured such that an upper surface thereof is recessed downward compared to other portions of the seating section 5. Thereby, a seating position of the driver D may be stabilized at a formation position of the seat section 51. In addition, in place of or in addition to such a recessed portion, one side or both sides of the front and the rear of the seat section 51 may also be provided with a portion protruding upward. Even in this case, the seating position of the driver D may be more stabilized so as not to shift from a position of the seat section 51.

As shown in FIG. 1, the vehicle 1 is provided with foot placement sections 6. The foot placement sections 6 are to place the feet of the seated driver D thereon. The foot placement sections 6 are located beneath the seating section 5 and respectively provided at left and right positions with the seating section 5 interposed therebetween. In other words, each of the foot placement sections 6 is located beneath the seating section 5 and provided at the same position as the seating section 5 in the forward and rearward direction of the vehicle 1. Here, the same position of the seating section 5 includes a nearly identical position. That is, the foot placement section 6 is provided at the same position as or the nearly identical position to the seating section 5 in the forward and rearward direction such that the head, the waist, and the foot of the driver D are positioned in a nearly straight line in the vertical direction when the driver D straddles the seating section 5 to place the foot on each foot placement sections 6. In this case, since the head, the waist, and the foot of the driver D are positioned in a nearly straight line in the vertical direction, a driving posture of the driver D is a horseback riding posture. In addition, FIG. 1 shows only a right foot placement section 6 of a pair of left and right foot placement sections 6 and 6.

Each of the foot placement sections 6 is mounted to the lower arm 41 connected to the associated wheel 2. For example, the foot placement section 6 is directly supported on the lower arm 41, or is indirectly supported through other member on the lower arm 41. Since the foot placement section 6 is mounted to the lower arm 41, the main body 3 may be easily inclined in an opposite lateral direction in such a manner that the driver D keeps or kicks the foot placed on the foot placement section 6. For this reason, a turning operation of the vehicle 1 is easily performed by the inclination of the main body 3.

The vehicle 1 is provided with an operation section 27. The operation section 27 is an operation section for a driving operation of the vehicle 1, and includes a grip section 27a gripped with a hand of the driver D. The grip section 27a is, for example, a vertical rod-shaped member, and includes two rod-shaped grip parts which may be respectively gripped with both hands of the driver D. The grip section 27a is disposed at a position at which the driver D grips the grip section 27a in a state in which the driving posture of the driver D is maintained in the horseback riding posture. For example, the grip section 27a functions as a manipulation section which gives driving operation command signals to a power source (not shown) of the vehicle 1. Specifically, the grip section 27a is configured such that an upper portion thereof is swingable about a lower portion thereof in the forward and rearward direction. When the grip section 27a is tilted forward so that the upper portion thereof is moved forward, operation control signals are output from a drive control section (not shown) to the power source. The power source is operated according to the operation control signals to rotatably drive the rear wheel 24, the front wheel 23, or the wheels 2, and thus the vehicle 1 travels forward. In this case, the vehicle 1 is driven and controlled such that driving force of the vehicle 1 is increased as a movement amount of the grip section 27a in the forward direction or an inclined angle of the grip section 27a is increased. In addition, when the grip section 27a is returned from a forward position to an original position, namely, to a neutral position, the provision of the driving force by the power source is stopped. Furthermore, when the grip section 27a is moved or inclined further rearward than the neutral position, braking force is applied to the rear wheel 24, the front wheel 23, or the wheels 2, and thus the vehicle 1 is stopped. When the grip section 27a is further moved or inclined rearward from such a stopped state, the vehicle 1 is driven and controlled so as to travel backward or be moved in reverse.

When the operation section 27 is integrally mounted to the main body 3, a steering operation of the vehicle 1 may not be performed by the operation section 27 and the grip section 27a, but a steering operation by turning of the front wheel 23 may be performed by integrally mounting the operation section 27 to the steering mechanisms 25 to rotate the operation section 27 or the grip section 27a to the left or the right. In addition, although a case in which the operation section 27 includes the vertical grip section 27a has been described in the embodiment, the grip section 27a may also be horizontally provided as in a handle of a bicycle or a motorcycle, or may also be provided as in a ring-shaped steering wheel such as a handle of a car.

Figure 3:
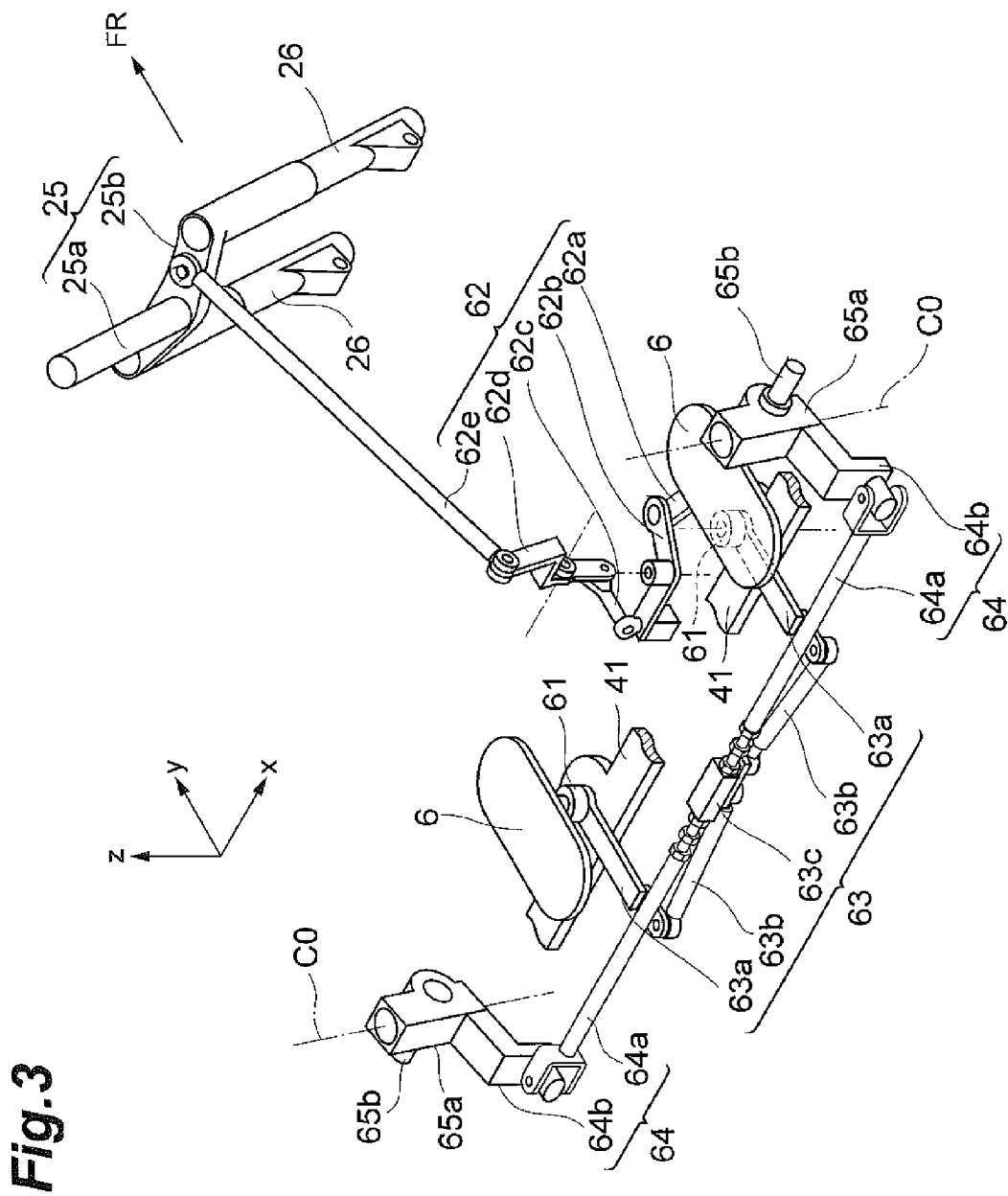
FIG. 3 is a perspective view illustrating steering effort transfer mechanisms of the vehicle of FIG. 1.

FIG. 3 is a view for explaining the foot placement sections 6 and a front wheel steering effort transfer mechanism 62.

Figure 4:
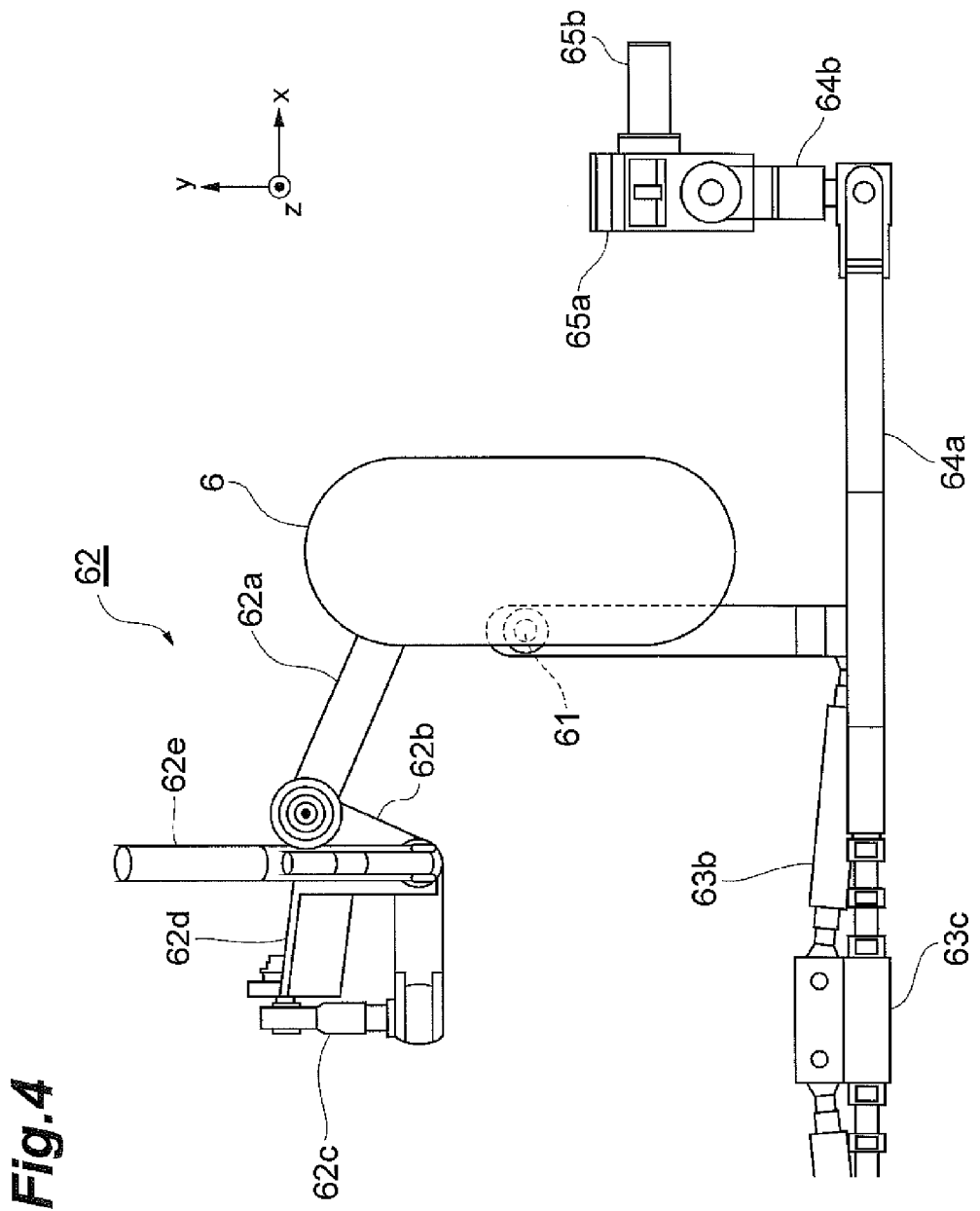
FIG. 4 is a top view illustrating the steering effort transfer mechanisms of the vehicle of FIG. 1.

FIG. 4 is a view when the front wheel steering effort transfer mechanism 62 is viewed from the plane.

The foot placement sections 6 are provided so as to be rotatable by moving the feet of the driver D, and the vehicle 1 may be steered to the left or the right by the rotation of the foot placement sections 6. In other words, the foot placement sections 6 are provided so as to be rotatable by moving the feet of the driver D, and the vehicle 1 during traveling may turn to the left or the right, namely, in the left direction or the right direction. That is, each of the foot placement sections 6 functions as a steering operation section or steering pedal of the vehicle 1. For example, the foot placement section 6 is sized suitable for placement of the foot of the driver D, and has a shape which is long in the forward and rearward direction of the vehicle 1. For example, the foot placement section 6 is provided so as to be rotatable about the vertical direction. Thereby, the foot placement section 6 rotates in such a manner that the driver D twists the foot, and the vehicle 1 may be steered or turned to the left or the right by the rotation motion.

Although a case in which the foot placement section 6 is rotated by twisting the foot of the driver D has been described herein, the foot placement section 6 may also be rotated by movement of the foot instead of the twisting of the foot, or the rotation motion may also be realized by rotatably moving the foot placement section 6 in a circular arc form. In addition, the foot placement section 6 has a smooth upper surface in FIG. 3, but the foot placement section 6 may also have an irregular upper surface in the vertical direction. In this case, the foot of the driver D may be suppressed from sliding on the foot placement section 6. In addition, an outer peripheral portion of the foot placement section 6 may also be provided with a protrusion section or projection section protruding upward. In this case, the foot of the driver D may be suppressed from shifting from the upper portion of the foot placement section 6.

The foot placement section 6 is mounted to the associated lower arm 41 through an axial support section 61 disposed beneath the foot placement section 6, and is provided so as to be rotatable on the lower arm 41. The axial support section 61 is provided at the lower arm 41 and axially supports the foot placement section 6 such that the foot placement section 6 is rotatable about a vertical axial line.

The front wheel steering effort transfer mechanism 62 which transfers steering effort to the front wheel 23 is connected to one foot placement section 6. The front wheel steering effort transfer mechanism 62 is a mechanism which transfers steering effort to the front wheel 23 according to rotation of the foot placement section 6. In other words, when a steering operation for rotating a forward portion of the foot placement section 6 is performed such that the forward portion of the foot placement section 6 is directed to the right or the left, the front wheel steering effort transfer mechanism 62 functions as a steering effort transfer mechanism which transfers the steering effort to the steering mechanism 25 of the front wheel 23 according to the steering operation.

For example, the front wheel steering effort transfer mechanism 62 includes a first link member 62a, a second link member 62b, a third link member 62c, a fourth link member 62d, and a fifth link member 62e. The first link member 62a is a rod-shaped member, is mounted to the right foot placement section 6, and is provided so as to horizontally protrude from the right foot placement section 6 to the forward left side. The first link member 62a is moved integrally with the foot placement section 6 and rotatably moved along with rotational movement of the foot placement section 6. The second link member 62b is a member having a bent shape, and an end portion thereof is rotatably mounted to a tip portion of the first link member 62a. A bent portion at an intermediate position of the second link member 62b is axially and rotatably supported by the lower arm 41. Thereby, the second link member 62b has a structure in which the other end portion thereof moves in the forward and rearward direction of the vehicle 1 by the rotational movement of the foot placement section 6. The third link member 62c is a rod-shaped member, an end portion thereof is rotatably mounted to a rear end of the second link member 62b, and the other end portion thereof is rotatably mounted to a lower end of the fourth link member 62d. The third link member 62c is arranged in the forward and rearward direction of the vehicle 1 and moves in the forward and rearward direction according to movement of the end portion of the second link member 62b in the forward and rearward direction. An end portion of the third link member 62c connected to the second link member 62b is formed with a ball joint, and is rotatable relative to the end portion of the second link member 62b. For example, a rotation coupling portion between the second link member 62b and the third link member 62c is located on a shaft of rotation mounting between the lower arm 41 and the main body 3 in the forward and rearward direction of an axial line C1 thereof to be described later. By using such a ball joint arrangement structure, it may be possible to absorb an influence caused by twisting between a mechanism at the foot placement section 6 and a mechanism at the front wheel 23 when the vehicle 1 is inclined inward during turning. The fourth link member 62d is a member having a bent shape and is disposed in the vertical direction. A bent portion at an intermediate position of the fourth link member 62d is axially supported so as to be rotatable relative to the main body 3. Consequently, by forward and rearward movement of the third link member 62c, a lower end of the fourth link member 62d moves in the forward and rearward direction of the vehicle 1, and the other upper end thereof moves so as to be close to or away from the steering mechanism 25 of the front wheel 23. An end portion of the fifth link member 62e is rotatably mounted to the upper end of the fourth link member 62d. The fifth link member 62e is a rod-shaped member, and the other end portion thereof is rotatably mounted to the horizontal member 25b of the steering mechanism 25. Thereby, the fifth link member 62e moves in a longitudinal direction and the steering effort is transferred to the steering mechanism 25 and the front wheel 23, according to movement of the fourth link member 62d.

As shown in FIG. 3, an interlocking mechanism 63 is provided between the right foot placement section 6 and the left foot placement section 6. The interlocking mechanism 63 is a mechanism which interlocks movement of the right foot placement section 6 and the left foot placement section 6. For example, the interlocking mechanism 63 is a mechanism which rotates the left foot placement section 6 in the right direction when the right foot placement section 6 is rotated in the right direction. For example, the interlocking mechanism 63 includes first link members 63a, second link members 63b, and a third link member 63c. The first link members 63a are each a rod-shaped member, and are respectively mounted to the right foot placement section 6 and the left foot placement section 6 one by one. For example, each of the first link members 63a is provided so as to protrude rearward from the associated foot placement section 6, moves integrally with the foot placement section 6, and rotates along with rotational movement of the foot placement section 6. An end portion of each second link member 63b is rotatably mounted to a rear end of the associated first link member 63a. The second link member 63b is a rod-shaped member, and is disposed in a width direction of the vehicle 1. The second link member 63b moves in the vehicle width direction according to the rotational movement of the first link member 63*a*. The third link member 63*c* is mounted to the other end portion of the second link member 63*b*.

The third link member 63*c* is a block-shaped member and is provided at a central position of the vehicle 1 in the vehicle width direction thereof. The third link member 63*c* functions as a coupling member which couples the right second link member 63*b* to the left second link member 63*b*. The third link member 63*c* transfers transmission power from the right second link member 63*b* to the left second link member 63*b*, and transfers transmission power from the left second link member 63*b* to the right second link member 63*b*.

The interlocking mechanism 63 forms a parallel crank mechanism with two first link members 63*a*, two second link members 63*b*, and the third link member 63*c*, and interlocks rotation motion of the right foot placement section 6 and the left foot placement section 6. In addition, as a mechanism for interlocking movement of the right foot placement section 6 and the left foot placement section 6, other mechanisms may also be used instead of the above interlocking mechanism 63.

As shown in FIG. 3, wheel steering effort transfer mechanisms 64 are provided to transfer steering effort of the foot placement sections 6 to the wheels 2. The wheel steering effort transfer mechanisms 64 are mechanisms which transfer steering effort to the wheels 2 and 2 according to rotation of the foot placement sections 6. In other words, when a steering operation for rotating the forward portion of each foot placement section 6 is performed such that the forward portion of the foot placement section 6 is directed to the right or the left, each wheel steering effort transfer mechanism 64 functions as a steering effort transfer mechanism or a side wheel steering effort transfer mechanism which transfers steering effort to the associated wheel 2 according to the steering operation. The wheel 2 functions as a steering wheel or a turning wheel of the vehicle 1. That is, the wheel 2 is turned when the steering effort is transferred to the wheel 2 by the wheel steering effort transfer mechanism 64, and thus the vehicle 1 may be turned.

For example, each of the wheel steering effort transfer mechanisms 64 includes a first link member 64*a* and a second link member 64*b*. The first link member 64*a* is provided to transfer steering effort to each of the right and left wheels 2 and 2 and the second link member 64*b* is provided to transfer steering effort to each of the right and left wheels 2 and 2. The first link member 64*a* is a rod-shaped member, and an end portion thereof is mounted to the third link member 63*c* of the interlocking mechanism 63. The other end portion of the first link member 64*a* is rotatably mounted to the second link member 64*b*. The second link member 64*b* has a bent shape, and is mounted to an axle housing 65*a*. The axle housing 65*a* is a housing member which houses an axle 65*b* as a shaft of the wheel 2. A lower portion of the axle housing 65*a* is rotatable about an axial line in the forward and rearward direction relative to the associated lower arm 41, and is mounted so as to be rotatable about a steering axial line C0 having a positive caster angle. An upper portion of the axle housing 65*a* is rotatable about the axial line in the forward and rearward direction relative to the associated upper arm 42, and is mounted so as to be rotatable about the steering axial line C0 having a positive caster angle.

In the wheel steering effort transfer mechanism 64, when the third link member 63*c* moves according to the steering operation of each foot placement section 6, each of the first link members 63*a* and 63*a* moves in the vehicle width direction. Through movement of the first link member 63*a*, the axle housing 65*a* and the axle 65*b* rotate about the steering axial line C0 through the associated second link member 63*b* and the wheel 2 is turned.

Figure 5:
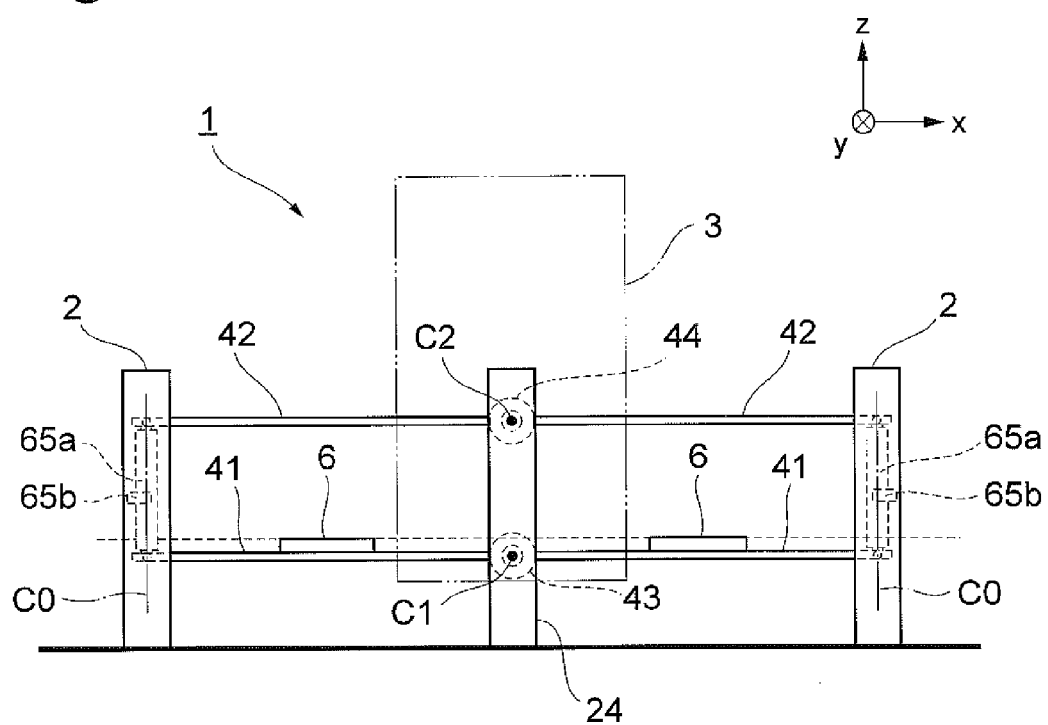
FIG. 5 is a schematic back view illustrating the vehicle of FIG. 1.
Figure 6:
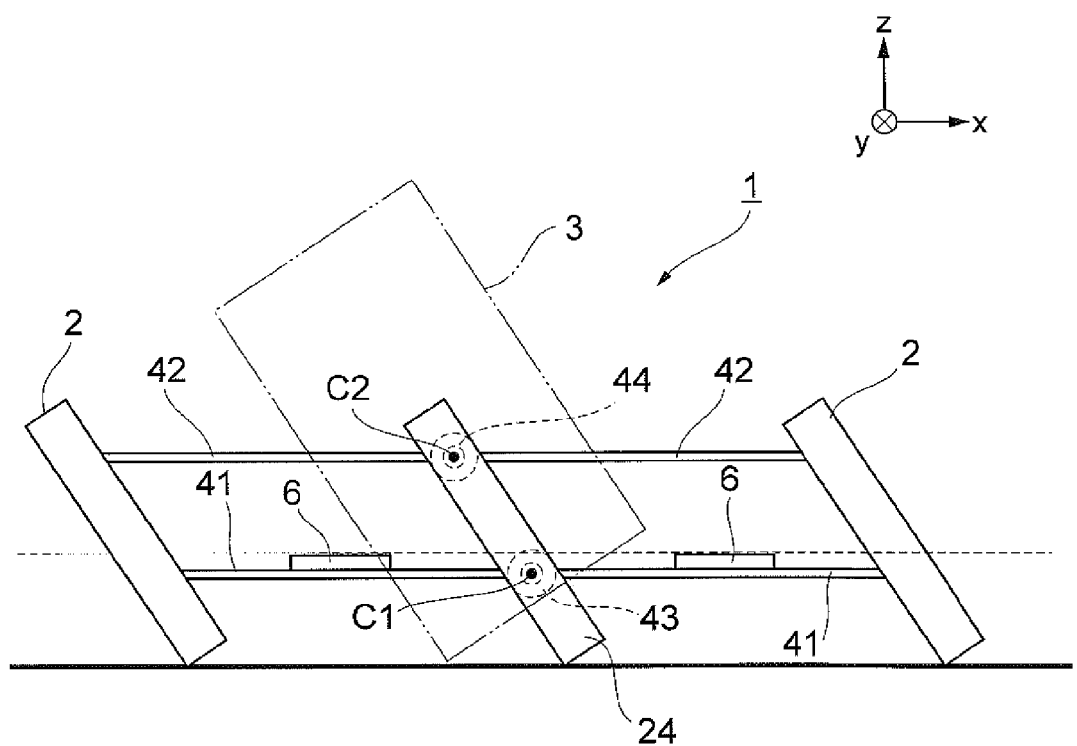
FIG. 6 is a schematic back view illustrating the vehicle of FIG. 1.

FIGS. 5 and 6 are schematic views for explaining the lower arms 41 and the upper arms 42 of the vehicle 1.

FIG. 5 is a view schematically illustrating a mounting structure of the lower arms 41 and the upper arms 42 when the vehicle 1 is viewed from the back. FIG. 6 is a view schematically illustrating a state of the lower arms 41 and the upper arms 42 when the vehicle 1 is turned.

As shown in FIG. 5, the right lower arm 41 and the left lower arm 41 are mounted to the main body 3, and are mounted so as to be rotatable about the same axial line C1 extending in the forward and rearward direction of the vehicle 1. For example, the right lower arm 41 and the left lower arm 41 are mounted so as to be rotatable about the same rotary shaft 43 which is directed in the forward and rearward direction of the vehicle 1. The rotary shaft 43 is provided in the forward and rearward direction of the vehicle 1 and mounted at a central position of the main body 3 in the vehicle width direction thereof. Each of the wheels 2 is mounted to an end portion of the associated lower arm 41 extending outward from the main body 3 so as to be rotatable about an axial line extending in the forward and rearward direction. For example, the axle housing 65*a* is rotatable about the axial line extending in the forward and rearward direction and is mounted to an outer end portion of the associated lower arm 41 so as to be rotatable about the steering axial line C0. The axle 65*b* is mounted to the axle housing 65*a* so as to be rotatable about an axial line extending in the vehicle width direction and the wheel 2 is mounted to the axle 65*b*.

Each of the upper arms 42 is arranged at an upward position of the associated lower arm 41 in parallel with the lower arm 41. The right upper arm 42 and the left upper arm 42 are mounted to the main body 3, and are mounted so as to be rotatable about the same axial line C2 directed in the forward and rearward direction of the vehicle 1. For example, the right upper arm 42 and the left upper arm 42 are mounted so as to be rotatable about the same rotary shaft 44 which is directed in the forward and rearward direction of the vehicle 1. The rotary shaft 44 is provided in the forward and rearward direction of the vehicle 1 and mounted at a central position of the main body 3 in the vehicle width direction thereof. Each of the wheels 2 is mounted to an end portion of the associated upper arm 42 extending outward from the main body 3 so as to be rotatable about an axial line extending in the forward and rearward direction. For example, the axle housing 65*a* is rotatable about the axial line extending in the forward and rearward direction and is mounted to an outer end portion of the associated upper arm 42 so as to be rotatable about the steering axial line C0.

As shown in FIG. 6, when the vehicle 1 is turned, the main body 3 and the wheels 2 and 2 are inclined toward an inner side in a turning direction. In this case, the left and right lower arms 41 and 41 connected to the main body 3 and the wheels 2 are respectively mounted so as to be rotatable about the same axial line C1 at a central position of the main body 3, thereby allowing the left and right lower arms 41 and 41 to be mutually kept linear and a variation in height position therebetween to be prevented. That is, a variation in position of the lower arm 41 to which each foot placement section 6 is mounted is decreased, and a variation in height position between the left and right lower arms 41 and 41 is decreased. Accordingly, the foot of the driver D is suppressed from significantly shifting in the vertical direction when the vehicle 1 is turned, and thus a stable driving operation may be performed. For example, in a case in which the right lower arm 41 is mounted to the right end of the main body 3 and the left lower arm 41 is mounted to the left end of the main body 3, when the vehicle 1 is turned to the right, the main body 3 is inclined inward to the right by turning of the vehicle 1, thereby allowing the position of the right lower arm 41 to be low and the position of the left lower arm 41 to be high. For this reason, a height position significantly differs between the left and right lower arms 41 and 41 and a height position between the foot placement sections 6 and 6 significantly differs and varies. Accordingly, when the vehicle 1 is turned, the foot of the driver D significantly shifts in the vertical direction. As described above, such a problem may be suppressed in the vehicle 1 according to the embodiment. In addition, the foot placement section 6 may also be provided on the upper arm 42 according to a mounting structure of arm members between the lower arm 41 and the upper arm 42. In addition, the upper arm 42 may not also be installed among the lower arm 41 and the upper arm 42. Furthermore, the same axial line about which the left and right lower arms 41 and 41 are mounted so as to be rotatable includes a nearly identical axial line. For example, when the main body 3 and the wheels 2 and 2 are inclined toward an inner side in a turning direction, the axial lines which are centers of rotation of the left and right lower arms 41 and 41 may also be shifted to each other, to the extent that a variation in position of each lower arm 41 to which the associated foot placement section 6 is mounted is small and a variation in height position between the left and right lower arms 41 and 41 is small.

Figure 7:
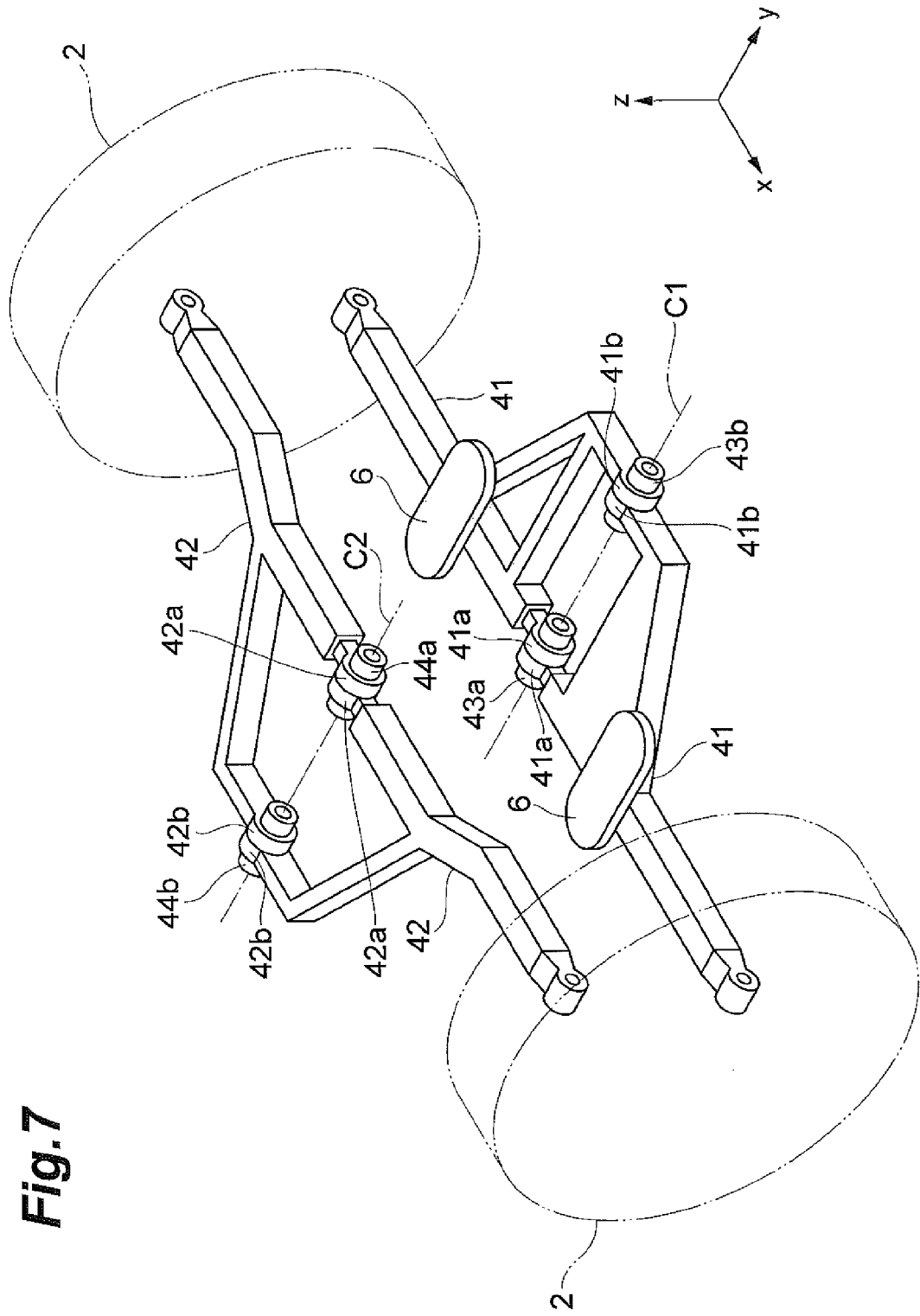
FIG. 7 is a view for explaining lower arms and upper arms of the vehicle of FIG. 1.

FIG. 7 shows a specific example of the lower arms 41 and the upper arms 42.

Each lower arm 41 is provided in the horizontal direction and includes two end portions 41a and 41b formed by branching of a body portion of the lower arm 41. The end portions 41a and 41b are mounted so as to be rotatable about the same axial line C1. In addition, the end portion 41a of the right lower arm 41 and the end portion 41a of the left lower arm 41 are axially supported by the same rotary shaft 43a and are rotatable about the rotary shaft 43a. The rotary shaft 43a is mounted to the main body 3. In addition, the end portion 41b of the right lower arm 41 and the end portion 41b of the left lower arm 41 are axially supported by the same rotary shaft 43b and are rotatable about the rotary shaft 43b. The rotary shaft 43b is mounted to the main body 3. Since two end portions 41a and 41b are provided at the body portion of each lower arm 41, mounting strength of the lower arm 41 to the main body 3 may be enhanced. In addition, the rotary shafts 43a and 43b form the rotary shaft 43 in FIGS. 5 and 6. In addition, a case in which the right lower arm 41 and the left lower arm 41 are mounted so as to be rotatable by the same rotary shafts 43a and 43b has been described herein. However, the right lower arm 41 and the left lower arm 41 may also be mounted by different rotary shaft members as long as the right lower arm 41 and the left lower arm 41 are mounted so as to be rotatable about the same axial line.

Each upper arm 42 is provided in the horizontal direction and includes two end portions 42a and 42b formed by branching of a body portion of the upper arm 42. The end portions 42a and 42b are mounted so as to be rotatable about the same axial line C2. In addition, the end portion 42a of the right upper arm 42 and the end portion 42a of the left upper arm 42 are axially supported by the same rotary shaft 44a and are rotatable about the rotary shaft 44a. The rotary shaft 44a is mounted to the main body 3. In addition, the end portion 42b of the right upper arm 42 and the end portion 42b of the left upper arm 42 are axially supported by the same rotary shaft 44b and are rotatable about the rotary shaft 44b. The rotary shaft 44b is mounted to the main body 3. Since two end portions 42a and 42b are provided at the body portion of each upper arm 42, mounting strength of the upper arm 42 to the main body 3 may be enhanced. In addition, the rotary shafts 44a and 44b form the rotary shaft 44 in FIGS. 5 and 6. In addition, a case in which the right upper arm 42 and the left upper arm 42 are mounted so as to be rotatable by the same rotary shafts 44a and 44b has been described herein. However, the right upper arm 42 and the left upper arm 42 may also be mounted by different rotary shaft members as long as the right upper arm 42 and the left upper arm 42 are mounted so as to be rotatable about the same axial line.

Next, a boarding posture of the vehicle 1 according to the embodiment will be described.

In FIG. 1, the driver D boards the vehicle 1 and straddles the seating section 5 to sit on the seating section 5. In this case, the legs of the driver D are lowered downward from the seating section 5 and the feet of the driver D are placed on the foot placement sections 6 provided beneath the seating section 5. The boarding posture of the driver D is a posture in which the head, the waist, and the feet of the driver D are positioned in a nearly straight line in the vertical direction, and is a so-called horseback riding posture or a posture similar to the horseback riding posture. For this reason, a main point of the upper body portion of the driver D affected by gravity (for instance, a lumbar vertebra) and a main point of a seat surface reaction (for instance, a portion around a hipbone) nearly coincide with each other, and retroversion moment by hamstring muscles of the leg portion is not generated in the pelvis. Accordingly, the retroversion of the pelvis of the driver D due to seating is suppressed and the seating posture is suppressed from being a stooped posture. Therefore, influences of the stooped posture regarding health (for instance, shoulder discomfort, lumbago, depressive condition, etc) may be suppressed and a good healthy driving posture of the driver D may be assumed.

In addition, since the spine of the driver D may be straightened by assuming the boarding posture, there is no need to provide a lumbar support which supports the lumbar vertebra portion of the driver D from the back. Accordingly, the cost and weight of the vehicle 1 are reduced.

In addition, in the boarding posture, the legs of the driver D are lowered downward from the waist portion. Thereby, the retroversion moment by the hamstring muscles of the leg portion is not generated in the pelvis and the retroversion of the pelvis is prevented. Therefore, the spinal cord of the driver D may be in good condition and an ideal state may be realized in spiritual and physical aspects of the driver D. In addition, in such a boarding posture, the spine is straightened, blood flow is good, and blood easily flows into the brain of the driver D. For this reason, a function of the brain of the driver D may be suppressed from deteriorating and thus driving determination may be properly performed.

In addition, in such a boarding posture, since the upper body of the driver D is vertically straightened, vibration such as pitching and rolling generated in the vehicle 1 may be suppressed from being directly transferred to the driver D. For example, when vibration such as pitching and rolling is generated in the vehicle 1, the vibration may be suppressed from being transferred to the upper body and head portion of the driver D by moving the waist and the like of the driver D.

Next, a driving operation of the vehicle 1 according to the embodiment will be described.

As shown in FIG. 1, the driver D grips the grip section 27a with the hand to perform the driving operation in a state of boarding the vehicle 1. When the grip section 27a is inclined forward to be tilted, the in-vehicle power source (not shown) is operated and the vehicle 1 travels forward by rotatably driving the rear wheel 24, the front wheel 23, or the wheels 2. In this case, since the grip section 27a is provided at a position at which the driver D stretches an arm and grips the grip section 27a with the hand, the driver D performs the driving operation while maintaining the horseback riding posture. When the driver D returns the grip section 27a to an original position, namely, to a neutral position, the provision of the driving force by the power source is stopped. Furthermore, when the grip section 27a is moved or inclined further rearward than the neutral position, the braking force is applied to the rear wheel 24, the front wheel 23, or the wheels 2, and thus the vehicle 1 is stopped.

When the driver D further moves or tilts the grip section 27a in the rearward direction from a stopped state of the vehicle 1, the in-vehicle power source, namely, a drive section is operated and the vehicle 1 is moved in reverse by reverse rotation of the rear wheel 24, the front wheel 23, or the wheels 2. As such, the vehicle 1 may travel forward or be moved in reverse by moving the grip section 27a in an intended direction. For this reason, since the vehicle 1 travels forward or is moved in reverse according to intuition of the driver D, the driving operation of the vehicle 1 may be easily performed. In addition, it may be possible to suppress erroneous operation of the vehicle 1.

When vibration due to pitching and rolling is generated in the vehicle 1 during traveling of the vehicle 1, the vibration may be suppressed from being transferred to the upper body and head portion of the driver D by moving the waist and the like of the driver D as described above.

Figure 8:
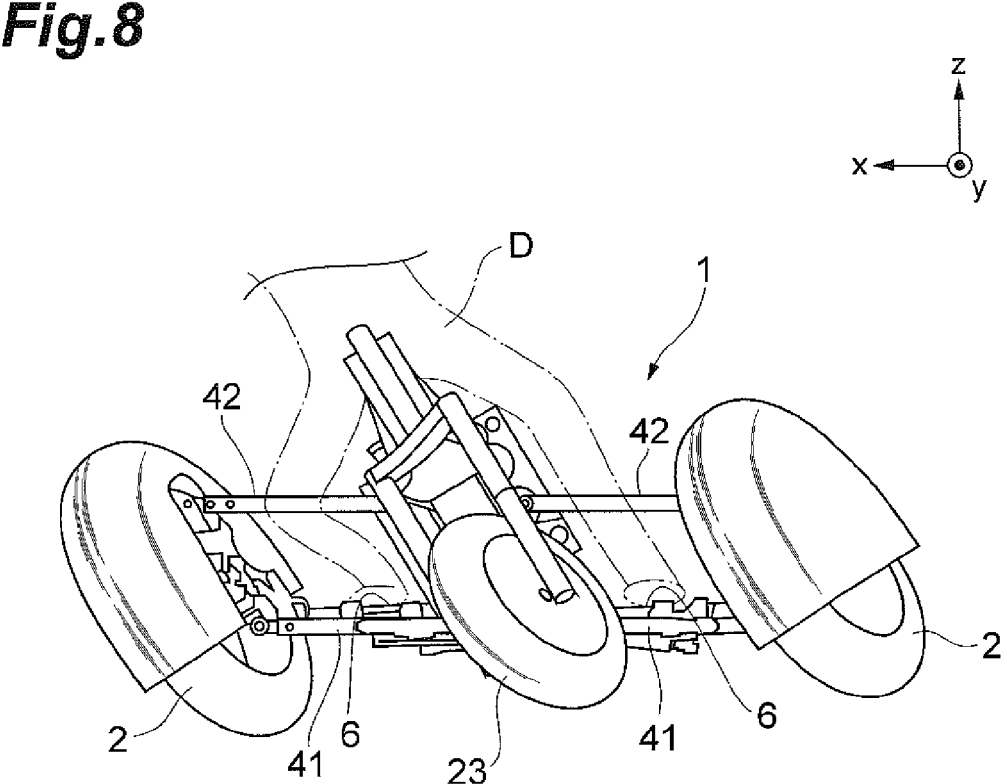
FIG. 8 is a view for explaining a driving operation of the vehicle of FIG. 1.

A turning operation of the vehicle 1 is performed as follows. As shown in FIG. 8, first, the main body 3 is inclined to the inner side in the turning direction in such a manner that the driver D keeps or kicks the feet placed on the foot placement sections 6. In this case, since the foot placement sections 6 are supported by the lower arms 41, the main body 3 of the vehicle 1 may be easily inclined by keeping or kicking the feet at the outer side in the turning direction. When the foot placement sections 6 are supported by the main body 3, lateral force is not added to the main body 3 even though the feet placed on the foot placement sections 6 are kicked and thus it is difficult to easily incline the main body 3. On the other hand, since the feet of the driver D are placed on the foot placement sections 6 provided on the lower arms 41 in the vehicle 1 according to the embodiment, the main body 3 may be easily inclined in the lateral direction and fine inclination adjustment may be easily performed.

The driver D twists the feet to rotate the foot placement sections 6, thereby transferring steering effort to the front wheel 23 and the wheels 2 and 2 according to the rotation motion. Thereby, the front wheel 23 and the wheels 2 and 2 are turned and the turning operation may be performed in a desired direction. In the turning operation, a certain turning operation may be performed since ground load reaction moment of steering rotation having a positive caster angle is changed by inward inclination of the main body 3 and the front wheel 23 and the wheels 2 and 2 are turned, but fine steering adjustment may be performed by rotation of the foot placement sections 6.

The turning operation may be performed in such a manner that the driver D turns the waist and the feet in an intended turning direction. Accordingly, since the turning operation is performed according to intuition, no erroneous operation is generated. In addition, since the driver D moves the feet and performs a steering operation, it may be possible to perform the steering operation using the leg muscles used in everyday life. For this reason, it may be possible to suppress the atrophy of the leg muscles of the driver D. Furthermore, in a driving posture in which the head, waist, and feet of the driver D are positioned in a nearly straight line in the vertical direction, the weight of the driver D is facilitated so as to be put on the feet and the steering operation according to keeping, kicking, and twisting of the feet is easily performed. Accordingly, the leg muscles of the driver D may be effectively used in the steering operation or the turning operation.

As described above, the vehicle 1 according to the embodiment includes the seating section 5 configured such that the driver D may take a seat by straddling the same and the foot placement sections 6 provided at the left and right positions with the seating section 5 interposed therebetween. Thereby, the driver D has a posture in which the head, waist, and feet of the driver D are positioned in a nearly straight line in the vertical direction when the driver D sits on the seating section 5 and places the feet on the foot placement sections 6. For this reason, the retroversion of the pelvis of the driver D due to seating is suppressed and the seating posture is suppressed from being a stooped posture. Therefore, a good healthy driving posture may be assumed.

In addition, since the foot placement sections 6 are supported by the lower arms 41 instead of the main body 3, the main body 3 may be easily inclined by keeping or kicking the feet placed on the foot placement sections 6. In addition, since the steering operation is performed by moving the feet placed on the foot placement sections 6 by the driver D, the steering operation may be performed using the leg muscles used in everyday life and the atrophy of the leg muscles may be suppressed. In addition, in the driving posture in which the head, waist, and feet of the driver D are positioned in a nearly straight line in the vertical direction, the weight of the driver D is facilitated so as to be put on the feet and the steering operation according to twisting of the feet is easily performed. Accordingly, the leg muscles of the occupant may be effectively used in the steering operation or the turning operation. Furthermore, the foot placement sections 6 are supported by the lower arms 41 connected to the wheels 2, a load is facilitated so as to be transferred to the wheels 2 by keeping the feet on the foot placement sections 6, and preferable operability is achieved. As such, the driving operation using the leg muscles may be performed in a good driving posture and the healthy vehicle 1 may be provided.

In addition, the vehicle 1 includes the front wheel steering effort transfer mechanism 62 and the wheel steering effort transfer mechanisms 64 which transfer steering effort to the turning wheels, namely the front wheel 23 and the wheels 2, according to rotation motion of the foot placement sections 6. Thereby, the steering effort may be transferred to turning wheels according to rotation of the foot placement sections 6 by moving the feet of the driver D and the vehicle may be surely turned.

In addition, according to the vehicle 1, the right lower arm 41 connected to the right wheel 2 and the left lower arm 41 connected to the left wheel 2 are mounted so as to be rotatable about the same axial line C1. Accordingly, when the vehicle 1 is turned, a variation in position of the lower arm 41 to which each foot placement section 6 is mounted is decreased, and a variation in height position between the left and right lower arms 41 and 41 is decreased. For this reason, the feet of the driver D are suppressed from significantly shifting in the vertical direction when the vehicle 1 is turned, and thus a stable driving operation may be performed.

The above-mentioned embodiment is an exemplary embodiment which describes the vehicle according to the present invention, and the vehicle according to the present invention is not limited thereto. The vehicle according to the present invention may be modified into various forms on the basis of the spirit of the invention. In addition, various changes and modifications may be made without departing from the concept and scope of the invention as defined in the following claims.

What is claimed is:

1. A vehicle having a pair of left and right wheels, the vehicle comprising:
   a seating section configured such that an occupant is able to take a seat by straddling the same;
   foot placement sections located beneath the seating section to be respectively provided at left and right positions with the seating section interposed therebetween, the foot placement sections being respectively supported by lower arms connected to the wheels, feet of the seated occupant being placed on the foot placement sections; and
   a grip section gripped with a hand of the occupant,
   wherein the foot placement sections are configured to rotate by movement of the feet of the occupant, and enable steering to be performed to the left and the right by rotation of the foot placement sections.

2. The vehicle according to claim 1, further comprising wheel steering effort transfer mechanisms that transfer steering effort to the wheels according to rotation of the foot placement sections,
   wherein the foot placement sections are configured to rotate by movement of the feet of the occupant, and enable steering to be performed to the left and the right through the wheel steering effort transfer mechanisms by rotation of the foot placement sections.

3. The vehicle according to claim 1, further comprising a right lower arm connected to a right wheel of the wheels and a left lower arm connected to a left wheel of the wheels,
   wherein the right and left lower arms are mounted so as to be rotatable about the same axial line extending in a forward and rearward direction.

4. The vehicle according to claim 1, further comprising a front wheel provided in front of the seating section and a rear wheel provided behind the seating section, in addition to the wheels.

5. The vehicle according to claim 4, further comprising a front wheel steering effort transfer mechanism that transfers steering effort to the front wheel according to the rotation of the foot placement sections,
   wherein the foot placement sections enable steering to be performed to the left and the right through the front wheel steering effort transfer mechanism by rotation of the foot placement sections.

\* \* \* \* \*